(12) United States Patent
Miyagawa et al.

(10) Patent No.: US 9,206,086 B2
(45) Date of Patent: Dec. 8, 2015

(54) METHOD AND APPARATUS FOR SINTERING FLAT CERAMICS

(71) Applicant: NITTO DENKO CORPORATION, Osaka (JP)

(72) Inventors: Hiroaki Miyagawa, Oceanside, CA (US); Guang Pan, Carlsbad, CA (US); Hironaka Fujii, Carlsbad, CA (US); Bin Zhang, San Diego, CA (US); Amane Mochizuki, Carlsbad, CA (US); Toshitaka Nakamura, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 70 days.

(21) Appl. No.: 13/865,950

(22) Filed: Apr. 18, 2013

(65) Prior Publication Data
US 2013/0277613 A1     Oct. 24, 2013

Related U.S. Application Data

(63) Continuation-in-part of application No. 13/842,878, filed on Mar. 15, 2013.

(60) Provisional application No. 61/635,129, filed on Apr. 18, 2012.

(51) Int. Cl.
*C04B 33/32* (2006.01)
*C04B 35/64* (2006.01)
(Continued)

(52) U.S. Cl.
CPC ............... *C04B 35/64* (2013.01); *B32B 18/00* (2013.01); *C04B 35/14* (2013.01); *C04B 35/44* (2013.01); *C04B 35/58* (2013.01); *C04B 35/597* (2013.01); *C04B 35/6261* (2013.01); *C04B 35/6263* (2013.01); *C04B 35/632* (2013.01); *C04B 35/6342* (2013.01); *C04B 35/63488* (2013.01); *C04B 38/067* (2013.01); *C04B 2235/3224* (2013.01); *C04B 2235/3225* (2013.01); *C04B 2235/3418* (2013.01); *C04B 2235/441* (2013.01); *C04B 2235/5409* (2013.01);
(Continued)

(58) Field of Classification Search
CPC ................ C04B 33/326; C04B 35/645; C04B 2235/6025
USPC ........................................................ 264/650
See application file for complete search history.

(56) References Cited

U.S. PATENT DOCUMENTS

| | | | |
|---|---|---|---|
| 3,879,509 A | 4/1975 | Elderbaum | |
| 4,009,238 A | 2/1977 | Niedermeier et al. | |

(Continued)

FOREIGN PATENT DOCUMENTS

| | | |
|---|---|---|
| JP | 2000304459 A | 11/2000 |
| JP | 2002029857 A | 1/2002 |

(Continued)

OTHER PUBLICATIONS

International Search Report mailed on Sep. 2, 2013 for Application No. PCT/US2013/037251.

*Primary Examiner* — Joseph S Del Sole
*Assistant Examiner* — Russell Kemmerle, III
(74) *Attorney, Agent, or Firm* — K&L Gates LLP; Louis C. Cullman; Brent A. Johnson (57) ABSTRACT

A method and apparatus for sintering flat ceramics using a mesh or lattice is described herein.

19 Claims, 4 Drawing Sheets

(51) Int. Cl.

| | | |
|---|---|---|
| *B32B 18/00* | (2006.01) | |
| *C04B 35/14* | (2006.01) | |
| *C04B 35/44* | (2006.01) | |
| *C04B 35/58* | (2006.01) | |
| *C04B 35/597* | (2006.01) | |
| *C04B 35/626* | (2006.01) | |
| *C04B 35/632* | (2006.01) | |
| *C04B 35/634* | (2006.01) | |
| *C04B 38/06* | (2006.01) | |

(52) U.S. Cl.
CPC .. *C04B 2235/6025* (2013.01); *C04B 2235/612* (2013.01); *C04B 2235/6562* (2013.01); *C04B 2235/6565* (2013.01); *C04B 2235/6581* (2013.01); *C04B 2235/763* (2013.01); *C04B 2235/963* (2013.01); *C04B 2235/9638* (2013.01); *C04B 2235/9653* (2013.01); *C04B 2237/343* (2013.01); *C04B 2237/562* (2013.01); *C04B 2237/567* (2013.01); *C04B 2237/704* (2013.01)

(56) References Cited

U.S. PATENT DOCUMENTS

| | | | | |
|---|---|---|---|---|
| 4,259,061 A | * | 3/1981 | Dubetsky | 432/13 |
| 4,340,436 A | | 7/1982 | Dubetsky et al. | |
| 4,421,700 A | * | 12/1983 | Patel | 264/640 |
| 4,753,694 A | | 6/1988 | Herron et al. | |
| 5,085,720 A | | 2/1992 | Mikeska et al. | |
| 5,130,067 A | | 7/1992 | Flaitz et al. | |
| 5,149,264 A | | 9/1992 | Horikawa et al. | |
| 5,370,759 A | | 12/1994 | Hakotani et al. | |
| 5,502,013 A | | 3/1996 | James | |
| 5,620,637 A | | 4/1997 | Kaga et al. | |
| 5,874,162 A | | 2/1999 | Bastian et al. | |
| 6,562,169 B2 | | 5/2003 | Natarajan et al. | |
| 6,607,620 B2 | | 8/2003 | Knickerbocker et al. | |
| 6,808,676 B1 | * | 10/2004 | Eisele | 264/607 |
| 7,045,239 B2 | | 5/2006 | Donelson et al. | |
| 7,332,228 B2 | * | 2/2008 | Fukaya et al. | 428/469 |
| 8,597,567 B2 | * | 12/2013 | Yokoyama et al. | 264/650 |
| 2002/0042037 A1 | | 4/2002 | Fukushima et al. | |
| 2007/0126017 A1 | * | 6/2007 | Krames et al. | 257/98 |
| 2007/0128504 A1 | * | 6/2007 | Horiuchi et al. | 429/44 |
| 2008/0206561 A1 | * | 8/2008 | Yokoyama et al. | 428/402 |
| 2010/0015396 A1 | * | 1/2010 | Johnson et al. | 428/142 |
| 2010/0119800 A1 | * | 5/2010 | Yokoyama et al. | 428/220 |
| 2012/0135215 A1 | * | 5/2012 | McEvoy et al. | 428/220 |
| 2012/0326344 A1 | * | 12/2012 | Kelso et al. | 264/21 |
| 2013/0277613 A1 | * | 10/2013 | Miyagawa et al. | 252/301.4 R |
| 2013/0288875 A1 | | 10/2013 | Miyagawa | |

FOREIGN PATENT DOCUMENTS

| | | |
|---|---|---|
| JP | 2002293651 A | 10/2002 |
| WO | 2013/158932 A1 | 10/2013 |

* cited by examiner

METHOD AND APPARATUS FOR SINTERING FLAT CERAMICS

CROSS REFERENCE TO RELATED APPLICATIONS

The present application claims the benefit of U.S. patent application No. 13/842,878, filed Mar. 15, 2013, which claims the benefit under 35 U.S.C. §119(e) to U.S. Provisional Application Ser. No. 61/635,129 filed Apr. 18, 2012, the entire contents of all of which are hereby incorporated by reference in their entirety.

FIELD OF THE DISCLOSURE

Disclosed herein are methods in which ceramic materials, such as phosphors, can be sintered by heating a precursor material between two mesh structures. Such methods reduce camber, warping and cracking of the ceramic materials. Also disclosed herein are ceramic materials made according to such methods, and devices comprising these ceramic materials.

BACKGROUND

Sintering of powders is part of the process in manufacturing various ceramic materials. Generally speaking, sintering includes mixing water, a binder, a deflocculant, and ceramic powder to form a slurry, then drying the slurry to form a dried powder such as by spray-drying, pressing the dried powder such as in a mold to form a green body (i.e., an unsintered ceramic item), heating the green body at low temperature to burn off the binder, then sintering at high temperature to fuse the ceramic particles together into the ceramic material.

It is known that sintering is associated with great shrinkage of the ceramic material as the ceramic powder is consolidated. Shrinkage in turn gives rise to camber, or warping and cracking, and surface damage of the ceramic material.

The present disclosure relates to methods of sintering ceramic materials which reduces or eliminates such difficulties associated with sintering of ceramic materials.

SUMMARY

The present disclosure relates to methods of sintering ceramic materials, such as phosphors, comprising heating a precursor material between two mesh (or lattice) structures. These methods reduce camber, or warping and cracking, of the ceramic materials. In certain embodiments, these methods can be used when the heating step(s) in the sintering process is done under pressure.

Some embodiments include a method of sintering a ceramic comprising: heating a ceramic precursor material between a first mesh and a second mesh, wherein at least a first portion of the ceramic precursor material contacts the first mesh and at least a second portion of the ceramic precursor contacts the second mesh during heating, thereby producing a sintered ceramic plate. In further embodiments, the ceramic precursor material is in the form of an unsintered ceramic compact comprising ceramic particles. In certain embodiments, the ceramic precursor material slidably contacts the first mesh and the second mesh.

In certain embodiments, the mesh comprises heat conductive material. In further embodiments, the heat conductive material has a degradation temperature greater than the sintering temperature of the unsintered ceramic compact. In some embodiments the degradation temperature is at least 200° C. greater than the sintering temperature.

In some embodiments of the methods, the ceramic precursor material is a product of a slurry of solvent, binder and ceramic particles that have been heated at a sufficiently high temperature to evaporate or burn substantially all of the binder and solvent. In certain embodiments, the ceramic precursor material is in the form of an unsintered green sheet comprising ceramic particles.

In some embodiments, the ceramic precursor material slidably contacts the first mesh and/or the second mesh at a plurality of substantially periodic distributed contact points or lines. In certain embodiments, the number of contact points or lines is approximately 500, 1000, 1500, 2000, 2500, 3000, 3500, 4000, 4500, 5000, 5500, 6000, 6500, 7000, 7500, 8000, 8500, 9000, 9500, or 10000.

Certain embodiments of the present methods further comprise applying sufficient pressure to the precursor material to reduce camber of the sintered ceramic plate but allow sliding engagement of the ceramic precursor material with the first mesh and/or the second mesh. In some embodiments, the camber of the sintered ceramic plate is less than 50 μm/mm$^2$ vertical displacement. In some embodiments, the applying sufficient pressure comprises placing a metal plate of about 0.1 gm/cm2 to about 20 gm/cm2 on the first mesh.

In certain embodiments of the present methods, the heat conductive material comprises stainless steel, iron, iron alloys, copper, copper alloys, niobium, niobium alloys, molybdenum, molybdenum alloys, nickel, nickel alloys, platinum, platinum alloys, tantalum, tantalum alloys, titanium, titanium alloys, tungsten, tungsten alloys, rhenium, rhenium alloys, or any combination thereof. In some embodiments, the heat conductive material substantially comprises tungsten. In other embodiments, the heat conductive material comprises a tungsten:molybdenum alloy. In certain embodiments, the tungsten:molybdenum alloy is about 3% molybdenum.

In some embodiments, either or both of the first mesh and the second mesh is configured as a plain weave. In other embodiments, either or both of the first mesh and the second mesh is configured as a twill weave.

In some embodiments, the ceramic precursor material is in the form of an unsintered ceramic compact comprising an oxide material. In certain embodiments, the oxide material comprises a metallic element such as, for example but without limitation, silicon. In other embodiments, the ceramic precursor material is in the form of an unsintered ceramic compact comprising a garnet material such as, for example but without limitation, yttrium. In other embodiments, the ceramic precursor material is in the form of an unsintered ceramic compact comprising a nitride material. In other embodiments, the ceramic precursor material is in the form of an unsintered ceramic compact comprising an oxynitride material. In certain embodiments, the oxynitride material comprises a metallic element such as, for example but without limitation, silicon.

In some embodiments, either or both of the first mesh and the second mesh comprise wires intersecting at an angle of about 10°, about 15°, about 30°, about 45°, about 60°, or about 80°. In some embodiments, either or both of the first mesh and the second mesh comprise wires intersecting at an angle of 90°.

In some embodiments, either or both of the first mesh and the second mesh have a mesh size that is about 5 wires per inch to about 500 wires per inch. In certain embodiments, the mesh size is about 40 wires per inch, about 50 wires per inch, about 60 wires per inch, about 70 wires per inch, or about 80 wires per inch. In certain embodiments, either or both of the first mesh and the second mesh have a mesh size of about 30 wires per inch to about 100 wires per inch, and a wire diameter of less than about 400 μm.

In some embodiments, either or both of the first mesh and the second mesh have a mesh size that is the same in both dimensions. In certain embodiments, the mesh size is about 40×40 wires per inch, about 50×50 wires per inch, about 60×60 wires per inch, about 70×70 wires per inch, or about 80×80 wires per inch.

In some embodiments, either or both of the first mesh and the second mesh have a mesh size that is not the same in both dimensions.

Further embodiments relate to a sintered ceramic plate produced according to any of the methods described herein. Yet other embodiments relate to a lighting device comprising a sintered ceramic plate produced by the any of the methods as disclosed herein.

BRIEF DESCRIPTION OF THE DRAWINGS

FIGS. 1A and 1B specifically depict an embodiment of a mesh of the interwoven type.

DETAILED DESCRIPTION

In the methods described herein, a ceramic precursor material is heated between two mesh structures, such as a first mesh and a second mesh. The precursor material is often in the form of a flat plate. Generally a first portion, or side in the case of a plate, of the precursor material comes in contact with the first mesh and a second portion, or side of the plate, comes in contact with the second mesh. The first mesh and the second mesh may be of the same or different type of mesh, and may comprise the same or different materials.

Figure 1A:
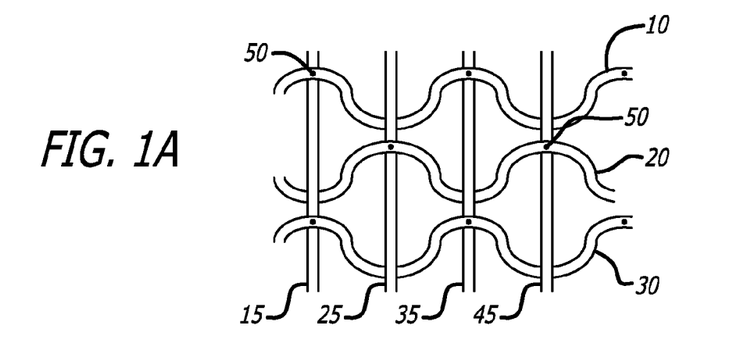
FIGS. 1A-C illustrate contact points in embodiment of a mesh comprising intersecting wires.
Figure 1B:
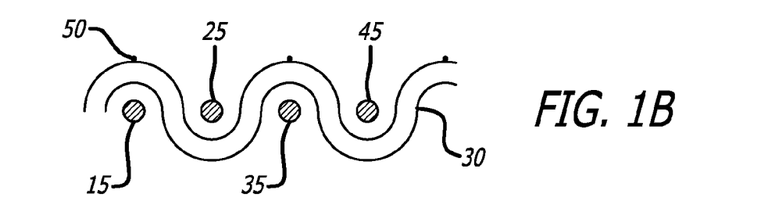
Figure 1C:
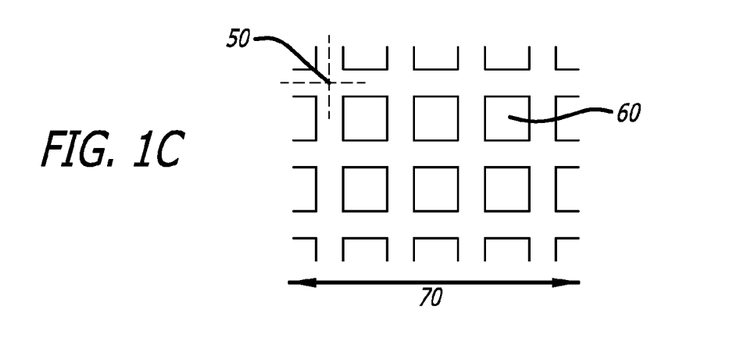

A first mesh or a second mesh (referred to collectively herein as "a mesh") refers to any structure that comprises intersecting strips or wires (referred to collectively hereafter as "wires"). By "intersecting" as used herein is meant simply that contact points 50 are created where the wires are in contact. See, e.g., FIGS. 1A-1C. Intersecting wires create a mesh opening 60. FIG. 1C. The mesh count or size 70 of a mesh refers to the number of wires in any one direction (commonly referred to as the "warp" in one direction, and the "weft" or "shute" in the other) per inch, cm or other unit of measure. See FIG. 1C. The specific characteristics of the mesh in any of various embodiments can vary depending upon the circumstances; e.g., the mesh size, the size and shape of the mesh opening, etc.

Figure 2A:
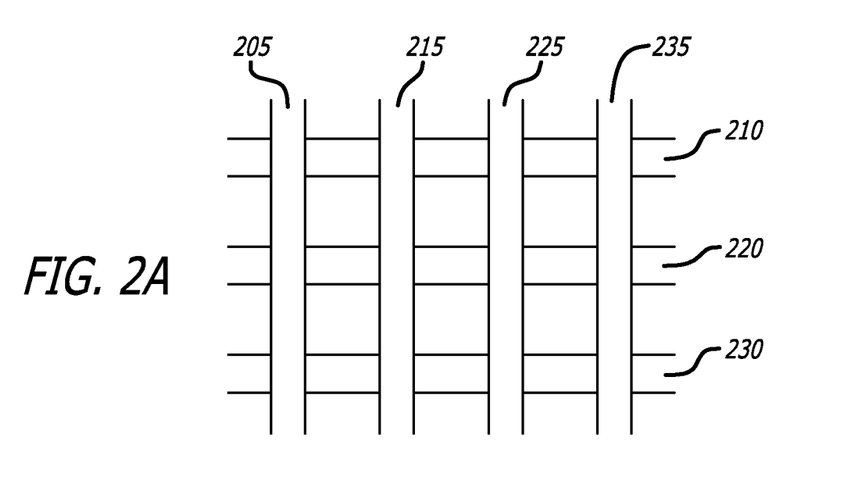
FIGS. 2A and B illustrate an embodiment of a mesh in which intersecting wires overlay each other.
Figure 2B:
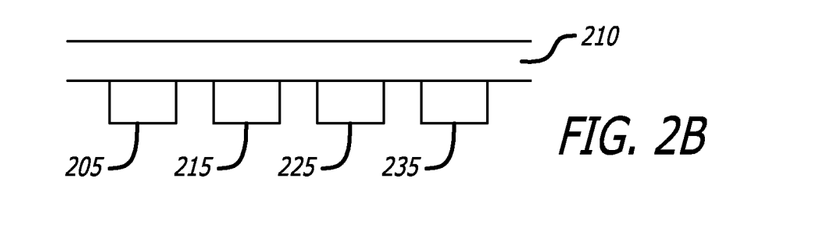

In some embodiments, the mesh is configured such that the intersecting wires of the mesh are interwoven. By "interwoven" is meant that each wire passes over and under one or more of its intersecting wires. FIG. 1A depicts an example of one type of interwoven mesh configuration, wherein wires 10, 20, and 30 are interwoven with wires 15, 25, 35, and 45. See also FIG. 1B, in which wire 30 is interwoven with wires 15, 25, 35 and 45. In such embodiments, contact points are formed when one wire is positioned above another. See, e.g., FIG. 1B, in which a contact points 50 are formed at each point where wire 30 intersects wires 15, 25, 35 and 45 in the interwoven structure. In some embodiments, the mesh is configured such that the intersecting wires of the mesh overlay each other. See, e.g., FIG. 2A, in which wires 205, 215, 225, and 235 overlay wires 210, 220, and 230. See also FIG. 2B, in which wire 210 overlays wires 205, 215, 225, and 235.

In some embodiments, the mesh can be configured as a combination of interwoven and overlaid wires; i.e., the intersecting wires of the mesh alternately overlay and are interwoven with each other.

For a weave such as a twill weave (FIG. 1D), wherein the intersecting wires of mesh overlay and underlay two (or more) intersecting wires at a time, instead of one, contact lines can be formed instead of contact points. Such a contact line 85 can be formed by the portion of the wire that overlays the two or more intersecting wires.

Wires may intersect one another at nearly any angle. For example, a mesh may comprise intersecting wires that are substantially perpendicular to one another; i.e., the intersecting wires are at right angles or 90° to each other. FIG. 1A depicts an example of such a mesh configuration, wherein wires 10, 20, and 30, and wires 15, 25, 35, and 45 are at substantially right angles. See also FIG. 1C and FIG. 2A. A mesh may also comprise intersecting wires that are at another angle to one another, such as 10°, 15°, 30°, 45°, 60°, 80°, or any angle in a range bounded by, or between, any of these values.

In some embodiments, the mesh opening is square. In other embodiments, the mesh opening is rectangular.

In some embodiments, the contact points or lines can be periodically distributed throughout the mesh. In some embodiments the contact points or lines can be substantially regularly or uniformly distributed or spaced throughout the mesh. Contact points or lines may be substantially the same as one another throughout a mesh.

Spacing between wires in a mesh may vary in various embodiments, depending upon the circumstance, resulting in various mesh sizes. In some embodiments, a mesh may have a mesh size of about 5 wires/inch to about 500 wires/inch, about 7 wires/inch to about 200 wires/inch, about 10 wires/inch to about 200 wires/inch, about 10 wires/inch to about 100 wires/inch, about 15 wires/inch to about 200 wires/inch, about 15 wires/inch to about 100 wires/inch, about 20 wires/inch to about 200 wires/inch, about 20 wires/inch to about 100 wires/inch, about 10 wires/inch, about 30 wires/inch, about 40 wires/inch, about 50 wires/inch, about 60 wires/inch, or any mesh size in a range bounded by, or between, any of these values. The mesh size may be the same in both dimensions, e.g. 10×10, 20×20, 30×30, 40×40, 50×50, 60×60, 70×70, 80×80, 90×90, 100×100 etc. (such as in a square-shaped mesh), or may be different, e.g. 10×20, 20×30, etc. (such as in a rectangular-shaped mesh).

The mesh may be in any shape, such as a square, rectangle, circle, oval, etc.

The cross section of a wire in a mesh may be substantially circular (see, e.g., FIGS. 1A and 1B), or may have another shape such as square, rectangular (see, e.g., FIG. 2B), oval, semicircular, etc. The sizes of the wires in the mesh can also vary in various embodiments. A wire may have a diameter or thickness in any suitable range. For example, some wires may have a diameter of about 10 μm to about 1 mm, about 20 μm to about 500 μm, about 50 μm to about 400 μm, about 50 μm, about 70 μm, about 69 μm, about 100 μm, about 102 μm, about 120 μm, about 127 μm, about 130 μm, about 380 μm, about 381 μm, or any diameter in a range bounded by, or between, any of these values. The intersecting wires of a mesh can be of the same or different sizes.

A mesh may be composed of any material capable of conducting heat, including a metal such as stainless steel, an iron, copper, niobium, molybdenum, nickel, platinum, tantalum, titanium, tungsten, or rhenium, or alloys containing any of the above metals, or any combination thereof. In some embodiments, the mesh can substantially comprise tungsten. In some embodiments, the mesh can comprise molybdenum. In some embodiments, the mesh can comprise tungsten and molybdenum. In some embodiments, the mesh can comprise 0.1-99.9% molybdenum:99.9%-0.01% tungsten. In some embodiments, the mesh can comprise 40 atom %-60 atom % molybdenum:60 atom %-40 atom % tungsten. In one embodiment, the mesh can comprise 50 atom % molybdenum:50 atom % tungsten. In some embodiments, the mesh can comprise at least one of tungsten and molybdenum and further comprise rhenium. Normally, the material of a mesh will have a higher degradation or melting temperature than the sintering temperature of the precursor material to be sintered. In some embodiments the metal has a melting temperature at least 200° C. greater than the desired sintering temperature.

Figure 1D:
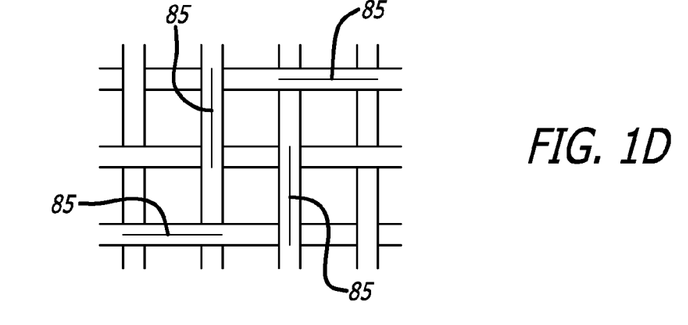
FIG. 1D depicts contact lines for twill weave.

In some embodiments, the mesh is configured as a "plain weave," in which intersecting wires are interwoven at right angles. In some embodiments, the mesh is configured as a "twilled weave," in which heavier wires are used to produce a square mesh opening, and each wire alternately overlays two wires and underlays two wires. (Such as depicted in FIG. 1D) By "staggering" the overlay of the wires, a diagonal pattern is produced in the twill weave mesh. In some embodiments, the mesh is configured as a "plain filter cloth" weave or "Dutch weave." In this configuration, intersecting wires are interwoven at right angles as in the "plain weave," but heavier warp and lighter shute wires are used, the shute wires being crimped to result in a smaller, triangular mesh opening. In some embodiments, the mesh is configured as a "twilled filter cloth" weave. In this configuration each wire alternately overlays two wires and underlays two wires, as in the "twilled weave," but different wire sizes are used for warp and shute. This permits twice the mesh count as the regular twilled weave. In some embodiments, the mesh is configured as a "micron" weave, in which finer wires overlap heavier wires with specialized wire placement, to create a higher mesh count. A micron weave mesh is extremely durable, and with such a configuration it is possible to have as many as 1,000,000 mesh openings per square inch. In some embodiments, the mesh is configured as a "grid" (or "grid specifications") weave, in which very fine wire is used, the wire comprising for example stainless steel. Such a mesh configuration can result in very high percent of mesh opening area.

In some embodiments, one or both meshes are not bonded to a precursor material before sintering. In some embodiments, a mesh may be slidably contacted with the precursor material. In some embodiments, the precursor material, such as a ceramic compact, may be slidably contacted with the meshes at a plurality of contact points or lines. A ceramic compact may comprise ceramic particles. "Slidably contacted" includes a situation in which solid precursor material can shrink or move in the direction of the plane of contact between the precursor material and a mesh. This may help to reduce the formation of cracks or cambering in a solid ceramic compact.

Any suitable heating regime may be used to heat a precursor material between two mesh structures. For example, the precursor material may be heated to a maximum temperature of about 1000° C. to about 3000° C., about 1500° C. to about 2000° C., or about 1800° C. Heating may occur for as long as desired to obtain the sintering effect sought, such as about 1 hour to about 50 hours, about 3 hours to about 20 hours, about 5 hours to about 20 hours, or, e.g., about 5 hours. In some embodiments, heating to maximum temperature, e.g. 1000-3000° C., may occur over a period of about 1 hour to about 10 hours, and the material may then be held at the maximum temperature for about 1 hour to about 20 hours.

In some embodiments, the mesh structures may be heated by a conductive plate, which may be composed of a conductive material such as a metal. Such conductive metal may include an iron alloy, a copper alloy, niobium, molybdenum, a nickel alloy, platinum, tantalum, titanium, tungsten, etc. Heating may be accomplished by using a configuration such as that depicted in FIG. 3. In such a configuration, a precursor material 310 is sandwiched between, and has thermal contact with, a first mesh 320 and a second mesh 330. Mesh 320 in turn has thermal contact with thermal conductive plate 340 and mesh 330 has thermal contact with thermal conductive plate 350. Thus, plate 340 and plate 350 can heat precursor material through the mesh 320 and 330. Mesh 320 and mesh 330 may comprise the same material, or different materials.

Figure 3:
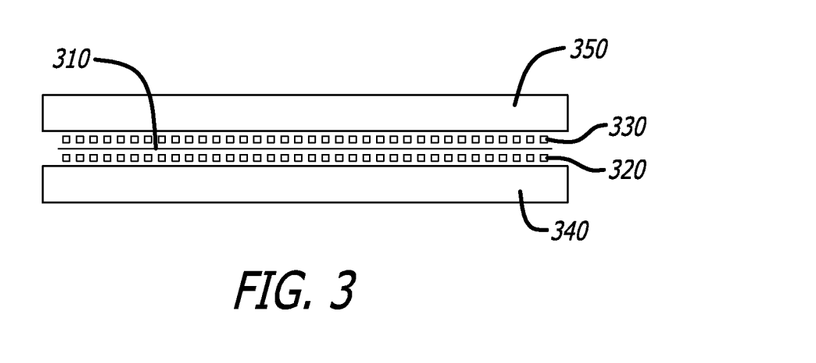
FIG. 3 illustrates an embodiment of a configuration of plates for sintering ceramic materials.

This type of configuration may also permit a precursor material, such as precursor material 310, to be pressurized by conductive plates, such as conductive plate 340 and conductive plate 350, which helps to reduce the warping and cracking associated with heating. In some embodiments, sufficient pressure may be applied to the precursor material to reduce camber. In some embodiments, pressure applied is sufficiently low to still permit sliding engagement between the mesh and the precursor materials. In some embodiments, pressure is applied by of the weight of the top plate, which presses through the first and second meshes and the precursor material to the bottom plate. In some embodiments, the top plate e.g. plate 350 (which, for the sake of reference, can be described as being placed on the first mesh), has a weight of about 0.01 g/cm$^2$ to about 100 g/cm$^2$ or about 0.1 g/cm$^2$ to about 20 g/cm$^2$. In some embodiments, a plate has a weight of about 2.5 g/cm$^2$ to about 7.5 g/cm$^2$. In some embodiments, the plates may be 2 inch×2 inch squares of a heat conductive material, such as tungsten, and may weigh about 15 g, about 23 g, or about 25 g.

In some embodiments, cambering is less than about 20%, about 10%, or about 5%, quantified as the amount of cambering as a percentage of the thickness of the flat ceramic piece. In some embodiments, cambering is less than about 100 μm/mm$^2$, about 50 μm/mm$^2$, or about 10 μm/mm$^2$.

A precursor composition may include any composition comprising at least two different atomic elements; e.g., $Al_2O_3$, $ZrO_2$, $Y_2O_3$, etc.

A precursor composition may comprise a bi-elemental oxide, including a compound containing at least two different atomic elements, wherein at least one of the two different elements includes oxygen.

A precursor composition may comprise a bi-elemental non-oxide, including a compound containing at least two different atomic elements, wherein the two different elements do not include oxygen.

In some embodiments, a precursor material may comprise a single or multiple oxide materials.

In some embodiments, a precursor composition can be a precursor host material. In some embodiments, the host material may be powder comprising a single inorganic chemical compound; e.g., $Y_3Al_5O_{12}$ (YAG) powder as compared to yttria and alumina. The host materials can have an average grain size diameter of about 0.1 μm to about 20 μm.

In some embodiments, a precursor composition can comprise phosphor powders. Phosphor powders can include, but are not limited to, oxides, such as oxides of metallic elements or silicon, including silicate, phosphate, aluminate, borate, tungstate, vanatate, titanate, molybdate or combinations of those oxides. Phosphor powders can also include sulfides, oxysulfides, oxyfluorides, nitrides, carbides, nitridobarates, chlorides, phosphor glass or combinations thereof.

In some embodiments, a precursor composition may comprise one or more oxynitrides, such as an oxynitride comprising a metallic element or silicon.

A precursor composition may include a host-dopant material, such as a material that is primarily a single solid state compound, or host material, having a small amount of one or more atoms in the host structure substituted by one or more non-host atoms, or dopant atoms. In some embodiments, a precursor composition can be a garnet host material or a nitride host material. In some embodiments the precursor composition can further comprises a dopant material.

In some embodiments, the precursor composition can include a garnet host material. As used herein, a "garnet" includes any material that would be identified as a garnet by a person of ordinary skill in the art, and any material identified as a garnet herein. In some embodiments, the term "garnet" refers to the tertiary structure of an inorganic compound, such as a mixed metal oxide.

In some embodiments, the garnet may be composed of oxygen and at least two different elements comprising groups II, III, IV, V, VI, VII, VIII, or Lanthanide metals. For example, the garnet may be composed of oxygen and a combination of two or more of the following elements: Ca, Si, Fe, Eu, Ce, Gd, Tb, Lu, Nd, Y, La, In, Al, and Ga.

In some embodiments, a synthetic garnet may be described with the formula $A_3D_2(EO_4)_3$, wherein A, D, and E are elements comprising group II, III, IV, V, VI, VII, VIII elements, and Lanthanide metals. A, D, and E may either represent a single element, or they may represent a primary element that represents the majority of A, D, or E, and a small amount of one or more dopant elements also comprising group II, III, IV, V, VI, VII, VIII elements, and Lanthanide metals. Thus, the above formula may be expanded to: (primary A+dopants)$_3$ (primary D+dopants)$_2$([primary E+dopants]O$_4$)$_3$.

In a garnet particle, the primary element or dopant element atom of A (e.g., $Y^{3+}$) may be in a dodecahedral coordination site or may be coordinated by eight oxygen atoms in an irregular cube. Additionally, the primary element or dopant element atom of D (e.g., $Al^{3+}$, $Fe^{3+}$, etc.) may be in an octahedral site. Finally, the primary element or dopant element atom of E (e.g., $Al^{3+}$, $Fe^{3+}$, etc.) may be in a tetrahedral site.

In some embodiments, a garnet can crystallize in a cubic system,
wherein the three axes are of substantially equal lengths and perpendicular to each other. In these embodiments, this physical characteristic may contribute to the transparency or other chemical or physical characteristics of the resulting material. In some embodiments, the garnet may be yttrium iron garnet (YIG), which may be represented by the formula $Y_3Fe_2(FeO_4)_3$ or $(Y_3Fe_5O_{12})$. In YIG, the five iron(III) ions may occupy two octahedral and three tetrahedral sites, with the yttrium(III) ions coordinated by eight oxygen ions in an irregular cube. In YIG, the iron ions in the two coordination sites may exhibit different spins, which may result in magnetic behavior. By substituting specific sites with rare earth elements, for example, interesting magnetic properties may be obtained.

Some embodiments comprise metal oxide garnets, such as YAG or $Gd_3Ga_5O_{12}$ (GGG), which may have desired optical characteristics such as transparency or translucency. In these embodiments, the dodecahedral site can be partially doped or completely substituted with other rare-earth cations for applications such as phosphor powders for electroluminescent devices. In some embodiments, specific sites are substituted with rare earth elements, such as cerium. In some embodiments, doping with rare earth elements or other dopants may be useful to tune properties such as optical properties. For example, some doped compounds can luminesce upon the application of electromagnetic energy. In phosphor applications, some embodiments are represented by the formula $(A_{1-x}RE_x)_3D_5O_{12}$, wherein A and D are divalent, trivalent, quadrivalent or pentavalent elements; A may comprise, for example, Y, Gd, La, Lu, Yb, Tb, Sc, Ca, Mg, Sr, Ba, Mn and combinations thereof; D may comprise, for example, Al, Ga, In, Mo, Fe, Si, P, V and combinations thereof; and, RE may be rare earth metal or a transition element comprising, for example, Ce, Eu, Tb, Nd, Pr, Dy, Ho, Sm, Er, Cr, Ni, and combinations thereof. This compound may be a cubic material having useful optical characteristics such as transparency, translucency, or emission of a desired color.

In some embodiments, a garnet may comprise yttrium aluminum garnet, $Y_3Al_5O_{12}$ (YAG). In some embodiments, YAG may be doped with neodymium ($Nd^{3+}$). YAG prepared as disclosed herein may be useful as the lasing medium in lasers. Embodiments for laser uses may include YAG doped with neodymium and chromium (Nd:Cr:YAG or Nd/Cr:YAG); erbium-doped YAG (Er:YAG), ytterbium-doped YAG (Yb:YAG); neodymium-cerium double-doped YAG (Nd:Ce:YAG, or Nd, Ce:YAG); holmium-chromium-thulium triple-doped YAG (Ho:Cr:Tm:YAG, or Ho, Cr,Tm:YAG); thulium-doped YAG (Tm:YAG); and chromium (IV)-doped YAG (Cr:YAG). In some embodiments, YAG may be doped with cerium ($Ce^{3+}$). Cerium doped YAG may be useful as phosphors in light emitting devices; e.g., light emitting diodes and cathode ray tubes. Other embodiments include dysprosium-doped YAG (Dy:YAG); and terbium-doped YAG (Tb:YAG), which are also useful as phosphors in light emitting devices. Some embodiments include gadolinium-doped YAG (Gd:YAG), such as gadolinium-doped YAG having about 0.1 atom % to 40 atom %, about 1 atom % to about 35 atom %, about 5 atom % to about 25 atom %, about 8 atom % to about 15 atom %, or about 10% atom % gadolinium, based upon the total number of atoms of yttrium and gadolinium.

In some embodiments, the sintered ceramic plate may be a lutetium aluminum oxide, such as an optionally doped lutetium aluminum garnet (LuAG). In some embodiments, the LuAG is undoped.

In some embodiments, the garnet host material can be a precursor material comprising an oxide of yttrium, an oxide of aluminum, an oxide of lutetium, and an oxide of gadolinium.

In some embodiments, the nitride host material can be a material having a quaternary host material structure represented by a general formula M—A—B—N:Z. Such a structure may increase the emission efficiency of a phosphor. In some embodiments, M is a divalent element, A is a trivalent element, B is a tetravalent element, N is nitrogen, and Z is a dopant/activator in the host material.

M may be Mg, Be, Ca, Sr, Ba, Zn, Cd, Hg, or a combination thereof. A may be B (boron), Al, Ga, In, Ti, Y, Sc, P, As, Sb, Bi, or a combination thereof. B may be C, Si, Ge, Sn, Ni, Hf, Mo, W, Cr, Pb, Zr, or a combination thereof. Z may be one or more rare-earth elements, one or more transition metal elements, or a combination thereof.

In the nitride material, a mol ratio Z/(M+Z) of the element M and the dopant element Z may be about 0.0001 to about 0.5. When the mol ratio Z/(M+Z) of the element M and the activator element Z is in that range, it may be possible to avoid decrease of emission efficiency due to concentration quenching caused by an excessive content of the activator. On the other hand, when the mole ratio is in that range, it may also be possible to avoid a decrease of emission efficiency due to an excessively small amount of light emission contributing atoms caused by an excessively small content of the activator. Depending on the type of the activating element Z to be added, an optimum percentage of Z/(M+Z) may vary. In some embodiments, a Z/(M+Z) mol ratio in a range from 0.0005 to 0.1 may provide improved emission.

For a composition wherein M is Mg, Ca, Sr, Ba, Zn, or a combination thereof, raw materials can be easily obtained and the environmental load is low. Thus, such a composition may be preferred.

For a composition wherein M is Ca, A is Al, B is Si, and Z is Eu in a material, raw materials can be easily obtained and the environmental load is low. Additionally, the emission wavelength of a phosphor having such a composition is in the red range. A red based phosphor may be capable of producing warm white light with high Color Rendering Index (CRI) at adjusted color temperature when combined with blue light emitting diode (LED) and yellow phosphors. Thus, such a composition may be preferred.

Some examples of a nitride host precursor include $Ca_3N_2$ (such as $Ca_3N_2$ having at least 2N), AlN (such as AlN having at least 3N), $Si_3N_4$ (such as $Si_3N_4$ having at least 3N). The term 2N refers to a purity of at least 99% pure. The term 3N refers to a purity of at least 99.9% pure.

In some embodiments, a precursor composition can further include a dopant precursor. In some embodiments, the dopant can be a rare earth compound or a transition metal. In some embodiments, the dopants can comprise $Ce^{3+}$, $Gd^{3+}$, and or $Eu^{2+}$. Suitable precursor dopant materials include, but are not limited to, $CeO_2$, $Ce(NO_3)_3$, $[Ce(NO_3)_3] \cdot [6H_2O]$, $Ce_2O_3$, $Gd_2O_3$, and/or EuN. Other suitable precursor dopant materials include the respective metal oxide of the desired dopant material; e.g., oxides of Tm, Pr, and/or Cr.

In some embodiments, a precursor material may be in the form of a ceramic compact. A ceramic compact includes precursor material that is compacted or preformed to some extent. Ceramic compacts may include materials to aid in sintering such as a solvent or a binder. Before or during sintering, the material may be heated to a sufficiently high temperature to remove any solvent, binder, and/or any other organic material.

In some embodiments, a ceramic compact may be in the form of a green sheet comprising ceramic particles.

In some embodiments, the garnet material, and other materials such as flux additives, plasticizers, solvents useful to create a slurry or green sheet, can be those materials as described in U.S. Pat. No. 8,283,843, filed Jan. 28, 2011 and U.S. Pat. No. 8,169,136, filed Feb. 19, 2009, which are incorporated by reference herein for all they disclose regarding materials for creating slurries or green sheets.

Figure 4:
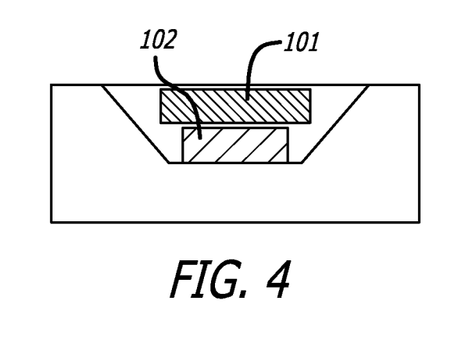
FIG. 4 illustrates an embodiment of a light-emitting device that includes a ceramic phosphor.

FIG. 4 shows an example of one way that a phosphor ceramic may be integrated into an LED. A phosphor ceramic 101 may be disposed above an LED 102 so that light from the LED passes through the phosphor ceramic before leaving the system. Part of the light emitted from the LED may be absorbed by the phosphor ceramic and subsequently converted to light of a lower wavelength by luminescent emission. Thus, the color of light-emitted by the LED may be modified by a phosphor ceramic such as phosphor ceramic 101.

Further embodiments include, but are not limited to, the following:

1. A method of sintering a ceramic to produce a sintered ceramic plate, comprising: heating a ceramic precursor material between a first mesh and a second mesh; wherein at least a first portion of the ceramic precursor material contacts the first mesh and at least a second portion the ceramic precursor material contacts the second mesh during heating, thereby producing a sintered ceramic plate.

2. The method of (1), wherein the ceramic precursor material is in the form of an unsintered ceramic compact comprising ceramic particles.

3. The method of (1) or (2), wherein the ceramic precursor material slidably contacts the first mesh and the second mesh.

4. The method of any one of (1)-(3), wherein either or both of the first mesh and the second mesh comprise heat conductive material.

5. The method of (4), wherein the heat conductive material has a degradation temperature greater than the sintering temperature of the unsintered ceramic compact.

6. The method of (5), wherein the degradation temperature is at least 200° C. greater than the sintering temperature.

7. The method of any one of (1)-(6), wherein the ceramic precursor material is a product of a slurry of solvent, binder and ceramic particles that have been heated at a sufficiently high temperature to evaporate or burn substantially all of the binder and solvent.

8. The method of any one of (1)-(7), wherein the ceramic precursor material is in the form of an unsintered green sheet comprising ceramic particles.

9. The method of any one of (1)-(8), wherein the ceramic precursor material slidably contacts the first mesh and/or the second mesh at a plurality of substantially periodic distributed contact points or lines.

10. The method of any one of (1)-(9), wherein the ceramic precursor material slidably contacts the first mesh and/or the second mesh at a plurality of substantially uniformly distributed contact points or lines.

11. The method of any one of (1)-(10), wherein the number of contact points or lines per square inch is approximately 500, 1000, 1500, 2000, 2500, 3000, 3500, 4000, 4500, 5000, 5500, 6000, 6500, 7000, 7500, 8000, 8500, 9000, 9500, or 10000.

12. The method of any one of (1)-(11), further comprising applying sufficient pressure to the precursor material to reduce camber of the sintered ceramic plate but allow sliding engagement of the ceramic precursor material with the first mesh and/or the second mesh.

13. The method of (12), wherein the camber of the sintered ceramic plate is less than 50 μm/mm² vertical displacement.

14. The method of (12) or (13), wherein the applying sufficient pressure comprises placing a metal plate of about 0.1 gm/cm2 to about 20 gm/cm2 on the first mesh.

15. The method of (4), wherein the heat conductive material comprises stainless steel, iron, iron alloys, copper, copper alloys, niobium, niobium alloys, molybdenum, molybdenum alloys, nickel, nickel alloys, platinum, platinum alloys, tantalum, tantalum alloys, titanium, titanium alloys, tungsten, tungsten alloys, rhenium, rhenium alloys, or any combination thereof.

16. The method of (15), wherein the heat conductive material substantially comprises tungsten.

17. The method of (15), wherein the heat conductive material comprises a tungsten:molybdenum alloy.

18. The method of (17), wherein the tungsten:molybdenum alloy is about 50 atom % molybdenum.

19. The method of any one of (1)-(18), wherein either or both of the first mesh and the second mesh comprise plural interwoven wires, wherein the plural interwoven wires provide a plurality of substantially uniformly distributed contact points or lines in a plane.

20. The method of any one of (1)-(19), wherein either or both of the first mesh and the second mesh is configured as a plain weave.

21. The method of any one of (1)-(19), wherein either or both of the first mesh and the second mesh is configured as a twill weave.

22. The method of any one of (1)-(21), wherein the ceramic precursor material is in the form of an unsintered ceramic compact comprising an oxide material.

23. The method of (22), wherein the oxide material comprises a metallic element.

24. The method of (22), wherein the oxide material comprises silicon.

25. The method of any one of (1)-(24), wherein the ceramic precursor material is in the form of an unsintered ceramic compact comprising a garnet material.

26. The method of (25), wherein the garnet material comprises yttrium.

27. The method of any one of (1)-(26), wherein the ceramic precursor material is in the form of an unsintered ceramic compact comprising a nitride material.

28. The method of any one of (1)-(27), wherein the ceramic precursor material is in the form of an unsintered ceramic compact comprising an oxynitride material.

29. The method of (28), wherein the oxynitride material comprises a metallic element.

30. The method of (28), wherein the oxynitride material comprises silicon.

31. The method of any one of (1)-(30), wherein either or both of the first mesh and the second mesh comprise wires intersecting at an angle of 90°.

32. The method of any one of (1)-(30), wherein either or both of the first mesh and the second mesh comprise wires intersecting at an angle of about 10°, about 15°, about 30°, about 45°, about 60°, or about 80°.

33. The method of any one of (1)-(32), wherein either or both of the first mesh and the second mesh have a mesh size that is about 5 wires per inch to about 500 wires per inch.

34. The method of (33), wherein the mesh size is about 10 wires per inch to about 200 wires per inch.

35. The method of (34), wherein the mesh size is about 30 wires per inch to about 100 wires per inch.

36. The method of (35), wherein the mesh size is about 40 wires per inch, about 50 wires per inch, about 60 wires per inch, about 70 wires per inch, or about 80 wires per inch.

37. The method of any one of (1)-(36), wherein either or both of the first mesh and the second mesh have a mesh size of about 30 wires per inch to about 100 wires per inch, and a wire diameter of less than about 400 µm.

38. The method of any one of (1)-(37), wherein either or both of the first mesh and the second mesh have a mesh size that is the same in both dimensions.

39. The method of (38), wherein the mesh size is about 40×40 wires per inch, about 50×50 wires per inch, about 60×60 wires per inch, about 70×70 wires per inch, or about 80×80 wires per inch.

40. The method of any one of (1)-(37), wherein either or both of the first mesh and the second mesh have a mesh size that is not the same in both dimensions.

41. The method of any one of (1)-(21) and (31)-(39), wherein the sintered ceramic plate comprises an optionally doped yttrium aluminum garnet.

42. The method of (41), wherein the sintered ceramic plate comprises gadolinium-doped yttrium aluminum garnet.

43. The method of (41), wherein the yttrium aluminum garnet is undoped.

44. The method of any one of (1)-(21) and (31)-(39), wherein the sintered ceramic plate comprises an optionally doped lutetium aluminum garnet.

45. The method of (44), wherein the lutetium aluminum garnet is undoped.

46. A sintered ceramic plate produced according to the method of any one of (1)-(45).

A lighting device comprising the sintered ceramic plate of (46).

EXAMPLES

Example 1

In this Example, 57.06 g of $Y_2O_3$ particles with a Brunauer-Emmett-Teller (BET) surface area of approximately 4.5 $m^2/g$, and 42.94 g of $Al_2O_3$ particles with a BET surface area of 5.6 $m^2/g$, were added to a 250 ml $ZrO_2$ ball mill jar (Torrey Hills Technologies, LLC, San Diego, Calif.). The total powder weight was 100.00 g and the mixing ratio of $Y_2O_3$ to $Al_2O_3$ was at a stoichiometric ratio of 3:5 in mol % for forming YAG. Dispersant (2.00 pph, 2.00 g) and tetraethyl orthosilicate (0.50 pph, 0.50 g) as a sintering aid were also added to the mill jar. Toluene (33.33 g) was added to the mill jar, and the contents in the mill jar were then stirred by hand until the mixture seemed liquid-like. Then 130 g of $ZrO_2$ milling media of 3 mm diameter were added to the mill jar, and the mixture in the mill jar was milled by a bench-top planetary ball mill (MTI Corporation, Richmond, Calif.) for about 24 h. as a first mixing step.

Concurrently, a binder solution of polymeric binder and plasticizers was prepared by dissolving 21.00 g poly(vinyl butyral-co-vinyl alcohol-co-vinyl acetate) (PVB), 10.50 g benzyl n-butyl phthalate (BBP), and 10.50 g polyethylene glycol (PEG) in 90 g toluene while stirring all for about 24 h. Binder solution (47.14 g) prepared as above was added to the milled solution of ceramic particles in the mill jar so as to contain 7.50 pph PVB, 3.75 pph BBP, and 3.75 pph PEG in the final slurry. Then this mixture was further ball-milled by the bench-top planetary ball mill for about an additional 24 h. When the entire ball milling process was completed, the resultant slurry was filtered through a syringe-aided metal screen filter with pore size of 0.05 mm, in order to remove aggregated ceramic particles. Viscosity of the resulted slurry was in the range of 400 cP to 800 cP. The slurry was then cast on silicone-coated polyethylene teraphthalate substrate film (Paul N. Gardner Company, Inc., Pompano Beach, Fla.) with an adjustable film applicator (Gardner Company) at a cast rate of 1.1 m/min. The blade gap of the film applicator was adjusted depending on the desired green sheet thickness. The cast tape was dried at ambient atmosphere to finally obtain an approximately 80-100 µm thick ceramic green sheet.

The dried green sheet was cut to the appropriate size by razor blade, the cut green sheets were detached from the PET substrate, and plural sheets were layered to obtain the desired thickness of the green sheet laminates in the range of 80 micron to 3.0 mm thick. This assembly was laminated at 24

MPa at room temperature for about 5 min., followed by 16 MPa at about 85° C. for about 5 min. using a TBH-100H heating press (Sansho Industry, Japan). The laminated compacts were then cut using the VLS 2.30 laser engraving and cutting system (Universal Laser Systems) with a 25 W $CO_2$ laser to obtain green laminate compacts of 12 mm×12 mm, 18.5 mm×18.5 mm, 30 mm×30 mm, or 50 mm×50 mm square shapes, or an 80 mm diameter disc. Each size of the cut laminate compacts was 10 mm×10 mm, 15 mm×15 mm, 25 mm×25 mm, or 40 mm×40 mm square shapes, or a 65 mm diameter disc-shape flat ceramic piece, respectively.

As the next step, the polymeric binder was removed from the laminated compacts. The laminated compacts were sandwiched between $Al_2O_3$ porous cover plates with 40% nominal porosity, in order to avoid the warping, cambering and bending of the laminated compacts during the debinding process. A plurality of green laminate compacts was stacked between porous $Al_2O_3$ cover plates (ESL ElectroScience, King of Prussia, Pa.), alternately. The laminated compacts were heated to about 1200° C. for about 2 h. in air using a ST-1700C-445 box furnace (SentroTech Corporation, Brea, Ohio) for de-binding and Bisk-firing. The heating and cooling rates were <0.7° C./min. and <4.0° C./min., respectively. The debinded/Bisk-fired blank samples were fully sintered at 1800° C. for about 5 hours under $10^{-3}$ Torr vacuum using a high temperature furnace whose heating elements were made of tungsten and which was attached with a mechanical pump. Inside the furnace chamber, the blank samples were sandwiched with tungsten mesh and tungsten plates, alternately. The mesh types used are summarized in Table 1, below. See also Comparative Example 4.

The heating rate of this final sintering process was about 16.7° C./min. (~400° C.), 8.0° C./min. (400-1000° C.), 5.0° C./min. (1000-1400° C.), 3.3° C./min. (1400-1500° C.), and 1.5° C./min. (1500-1800° C.), whereas the cooling rate was 8.0° C./min. in order to minimize cracking during sintering.

Tungsten mesh can provide "point contact" and/or "2-dimensional (2-D) line contact" (not "area contact") support during sintering. This point or 2-D line contact allows the thin green compact to shrink during sintering at high temperature. As a result, the YAG flat ceramic pieces were sintered at 1800° C. without cracking due to the tungsten mesh.

In summary, the green compacts were successfully sintered to be substantially flat, thin ceramic pieces without cracking regardless of (a) slurry type, with xylene-ethanol mixed solvent, toluene, or water; or, (b) the doping elements for the YAG ceramics; or, (c) different sintering temperatures between 1700-1800° C.; or, (e) existing air voids in the final sintered YAG plates (instead of fully transparent YAG plates) for light scattering. These methods should be applicable not only to vacuum sintering but also $H_2$, $N_2$, Ar, and mixed gas sintering.

Table 1 shows a summary of the various types of mesh used for sintering the flat ceramics of this Example 1 and the remaining Examples ("M"=Mesh; "CE"=Comparative Example; "W"=tungsten; "Mo"=molybdenum). Note that Mesh 1-7 were square-shaped mesh; i.e., the mesh size (at [warp wires per inch]×[shute wires per inch]) was the same in both dimensions.

TABLE 1

| | M1 | M2 | M3 | M4 | M5 | M6 | M7 | CE2 | CE3 | CE4 | CE5 |
|---|---|---|---|---|---|---|---|---|---|---|---|
| Wire diam. (μm) | 100 | 70 | 50 | 100 | 125 | 100 | 381 | | | | |
| Wire material | W/3% Mo alloy | W | W | W | W | W | W | W plate | W plate | W plate | W plate |
| Msize (in.) | 80 × 80 | 50 × 50 | 50 × 50 | 60 × 60 | 40 × 40 | 30 × 30 | 10 × 10 | | | | |
| M type | Plain | Plain | Plain | Twill | Plain | Plain | Plain | | | | |
| # contact pts./in.$^2$ | 6400 | 2500 | 2500 | 2100 | 1600 | 900 | 100 | | | | |
| Sample thickness in μm (in.) | 250 μm | 200 μm | 100 μm | 250 μm | 300 μm | 225 μm | | 381 (0.015) | 381 (0.015) | 1,000 | 50 (0.002) |
| Surface roughness (Ra) in μm | 8.62 | 8.43 | 8.43 | 8.32 | 7.55 | 6.88 | | 0.65 | 3.46 | | |
| Results | Good | Good | Good | Good | Good | Good | Not good | Not good | Not good | Not good | Not good |

Example 2

Aqueous slurry was prepared as set forth in Example 1, excepting as follows: 133.55 g $Y_2O_3$ particles, 23.82 g $Gd_2O_3$ particles with a BET surface area of 2.9 m$^2$/g, 111.68 g $Al_2O_3$ particles, 45.00 g aqueous acrylic polymer solution (solid content: 35 wt %) as a main component of polymeric binder for final green sheet, 0.49 g aqueous solution of 2,4,7,9-tetramethyl-5-decyne-4,7-diol ethoxylate solution as a defoamer for aqueous slurry, 4.87 g of aqueous 2-amino-2-methyl-1 propanol solution as a plasticizer, and 125.00 g milli-Q water were added to a 1.0 L high density polyethylene (HDPE) thick wall jar, with an inner diameter of 124 mm (BHB-1100, Kinki Youki, Japan), for an aqueous slurry preparation.

The contents in the HDPE jar were then shaken by hand until the mixture seemed liquid-like. A 1.5 kg $ZrO_2$ milling media of 5-10 mm diameter was added to the HDPE jar, and the mixture in the HDPE jar was milled at 70 rpm by 700 series "roller-type" jar mill (US Stoneware, East Palestine, Ohio) for about 16 h. Afterwards, an additional 55.59 g aqueous acrylic polymer solution was added to the milled solution of ceramic particles in the HDPE jar to finally contain 60 vol % ceramic particles in the final aqueous slurry. Then this mixture was further milled by the roller-type jar mill for an additional approximately 4 h. When the entire ball milling process was completed, the resultant slurry was filtered through a syringe-aided metal screen filter with pore size of 0.05 mm, in order to remove aggregated ceramic particles.

Viscosity of the resulted slurry was in the range of 200 cP to 350 cP. The slurry was then cast on 75 μm thick silicone-coated polyethylene terephthalate Mylar substrate film (Hansung Systems Inc., South Korea) using an automated roll-to-roll Model 102 tape caster (DreiTek, Valley Center, Calif.) at a cast rate of 200 mm/min. The blade gap of the film applicator was adjusted depending on the desired green sheet thickness. The cast tape was dried at 55-80° C. at five different heat zones with a length of 0.5 m each, to finally obtain a YAG ceramic green sheet either 45 or 60 μm thick.

The dried green sheet was cut to be about 135 mm×135 mm using a razor blade. Either four layers of the 45 μm thick green sheets or three layers of the 60 μm thick green sheets having the same composition were assembled on an anodized aluminum plate, and this assembly was vacuum-bagged before pressing. This assembly was laminated using a cold isostatic press (CIP) at 40 MPa at 80° C. for 10 min. using an ILS-66 isostatic lamination press (Keko Equipment, Slovenia). As a result, an approximately 135 mm×135 mm×0.17 mm laminated green laminate was obtained. The green laminate was then laser-cut to the size of an 18.5 mm×18.5 mm cubic shape using a VLS 2.30 laser engraving and cutting system (Universal Laser Systems) with a 25 W $CO_2$ laser for the following Bisk firing and sintering processes, which were the same as those outlined in Example 1.

The debinded/Bisk-fired blank samples were fully sintered at 1800° C. for about 5 hours under a $10^{-5}$ Torr vacuum using a high temperature furnace, in which the heating elements were made of tungsten and which was attached with a diffusion pump for a higher vacuum level. The heating rate of this final sintering process was about 16.7° C./min. (~400° C.), 8.0° C./min. (400-1000° C.), 2.5° C./min. (1000-1400° C.), (1.7° C./min. 1400-1500° C.), and 0.8° C./min (1500-1800° C.), whereas the cooling rate was 8.0° C./min. in order to minimize cracking during sintering. Finally, ceramic plates of 15 mm×15 mm size were obtained.

Mesh 7 (see Table 1) displayed significant warpage in this Example. See Table 3, and explanation of warpage measurement, below.

Example 3

Similar YAG ceramics were processed as detailed in Example 2, except that 4.47 g of polymeric beads, which were made of cross-linked poly(methyl methacrylate) and with a bead diameter of 8 μm, were also added to the milled solution in the HDPE jar to create 6.0 vol % voids, after the initial 16 h. ball-milling. These beads would create air voids after the Bisk-firing, and these voids remained even after the end of sintering using a tungsten furnace. Eventually these voids lead to the light scattering.

Mesh 7 (see Table 1) displayed significant warpage in this Example. See Table 3, and explanation of warpage measurement, below.

Example 4

Similar YAG ceramics were processed as detailed in Example 2, except that 97.50 g $Y_2O_3$ particles, 73.38 g $Al_2O_3$ particles, 27.00 g aqueous acrylic polymer solution, 0.32 g aqueous solution of 2,4,7,9-tetramethyl-5-decyne-4,7-diol ethoxylate solution as a de-foamer for aqueous slurry, 3.18 g of aqueous 2-amino-2-methyl-1 propanol solution as a plasticizer, and 60.00 g milli-Q water were added to a 16 oz. (0.45 L) polypropylene (PP) thick wall jar, with an inner diameter of 80 mm (Parkway Plastics Inc., Piscataway, N.J.).

Then 760 g $ZrO_2$ milling media of 5-10 mm diameter was added to the PP jar, and the mixture in the PP jar was milled at 96 rpm by a 700 series "roller-type" jar mill (US Stoneware, East Palestine, Ohio) for about 16 h. Afterwards, an additional 38.63 g of aqueous acrylic polymer solution was added to the milled solution of ceramic particles in the PP jar to finally contain 60 vol % ceramic particles in the final slurry. Then this mixture was further milled by the roller-type jar mill for about an additional 4 h. The slurry was tape-cast to finally obtain an approximately 60 μm thick ceramic green sheet. The dried green sheet was cut to be about 135 mm×135 mm using a razor blade. Seven layers of the 60 μm thick green sheets having the same composition were assembled on an anodized aluminum plate. This assembly was vacuum-bagged and then isostatically pressed at 40 MPa at 80° C. for 10 min.

Example 5

Transparent LuAG ceramics were processed as detailed for YAG ceramics in Example 2, except that 75.24 g $Lu_2O_3$ particles with a BET surface area of 2.0 $m^2/g$, 32.13 g $Al_2O_3$ particles, 15.00 g aqueous acrylic polymer solution, 0.14 g aqueous solution of 2,4,7,9-tetramethyl-5-decyne-4,7-diol ethoxylate solution as a de-foamer for aqueous slurry, 1.35 g of aqueous 2-amino-2-methyl-1 propanol solution as a plasticizer, and 30.00 g milli-Q water were added to an 8 oz. (0.23 L) polypropylene (PP) thick wall jar, with an inner diameter of 80 mm (Parkway Plastics Inc., Piscataway, N.J.).

Then 380 g $ZrO_2$ milling media of 5-10 mm diameter was added to the PP jar, and the mixture in the PP jar was milled at 96 rpm by a 700 series "roller-type" jar mill (US Stoneware, East Palestine, Ohio) for about 16 h. Afterwards, an additional 12.81 g of aqueous acrylic polymer solution was added to the milled solution of ceramic particles in the PP jar to finally contain 60 vol % ceramic particles in the final slurry. Then this mixture was further milled by the roller-type jar mill for about an additional 4 h. The slurry was tape-cast to finally obtain an approximately 65 μm thick ceramic green sheet. The dried green sheet was cut to be about 135 mm×135 mm using a razor blade. Three layers of the 65 μm thick green sheets having the same composition were assembled on an anodized aluminum plate. This assembly was vacuum-bagged and then isostatically pressed at 40 MPa at 80° C. for 10 min.

Example 6

Transparent LuAG ceramics were processed as detailed in Example 5, except that two layers of the 65 μm thick green sheets having the same composition were assembled on an anodized aluminum plate. This assembly was vacuum-bagged and then isostatically pressed at 40 MPa at 80° C. for 10 min.

A summary of the ceramic samples prepared according to Examples 1-6 above are summarized in Table 2.

TABLE 2

| | Example | | | | | |
|---|---|---|---|---|---|---|
| | 1 | 2 | 3 | 4 | 5 | 6 |
| Solvent | Toluene | Milli-Q water | Milli-Q water | Milli-Q water | Milli-Q water | Milli-Q water |
| Garnet type | YAG | YAG | YAG | YAG | LuAG | LuAG |
| Gd-doping % | N/A | 10 | 10 | N/A | N/A | N/A |
| Void vol % for light scattering | N/A | N/A | 6 | N/A | N/A | N/A |
| Final ceramic thickness (μm) | 150 | 150 | 150 | 350 | 150 | 100 |

Comparative Example 1

Garnet ceramic plates, derived as in Examples 1-6, were sintered on a tungsten plate without a top cover plate. All samples were warped after sintering in a high temperature vacuum furnace (1800° C.) made of tungsten. There were hardly any flat ceramics obtained, due to the lack of a top cover plate during sintering.

Comparative Example 2

Four pieces of 18.5 mm×18.5 mm blank samples of garnet ceramics were sandwiched between 15 mg tungsten plates of a diameter of 50 mm×50 mm×0.38 mm (w/o tungsten mesh) to reduce warpage as seen in Comparative Example 1. The surface roughness, represented by the arithmetic mean value Ra, of the tungsten plates was 0.65 micron. All garnet ceramics of less than 150 micron thick were cracked, whereas approximately 50% of the 350 micron thick garnet ceramics were cracked, after sintering using a high temperature vacuum tungsten furnace (1800° C.). The reason for sample cracking appeared to be due to a small area of the samples sticking to the tungsten plate. Such area contact (as distinguished from spot contact, as when mesh is used) constrained sample shrinkage during sintering, which thus led to the cracking during the sintering process, which was especially pronounced in the thinner ceramics.

Comparative Example 3

Four pieces of 18.5 mm×18.5 mm blank samples of garnet ceramic were sandwiched between 15 mg tungsten plates with a diameter of 50 mm×50 mm×0.38 mm (w/o tungsten mesh) to reduce warpage. The surface roughness (Ra) of the tungsten plates in this Example was 3.46 micron. As in Comparative Example 2, all garnet ceramics of less than 150 micron thick were cracked, whereas approximately 50% of the 350 micron thick garnet ceramics were cracked, after sintering using high temperature vacuum tungsten furnace (1800° C.). The reason for sample cracking of again appeared to be due to a small area of the samples sticking to the tungsten plate, which area contact constrained sample shrinkage during sintering, leading to cracking during sintering.

Comparative Example 4

Four pieces of 18.5 mm×18.5 mm blank samples of garnet ceramics were sandwiched between 10 mg of porous zirconia plates (instead of tungsten mesh+tungsten plates) having a size of 50 mm×50 mm×1.0 mm, to prevent warpage. Zirconia plates were selected due to zirconia's high melting point (2400° C.). Although the utility of zirconia cover plates occasionally resulted in the desired level of flatness of the obtained YAG ceramics, the surface of the YAG plates often reacted with the zirconia cover plates above 1675° C., which lead to a non-homogeneous surface roughness on the YAG plate surface, which could easily be found visually. Additionally, YAG ceramics cannot be sintered above 1700° C., since the YAG and zirconia often reacted at high temperature, and two of the oxide flat ceramic pieces adhered at such high temperature.

Comparative Example 5

YAG flat ceramic pieces were sandwiched with molybdenum foil (instead of tungsten mesh) to reduce warpage. This enabled the YAG plates to be sintered at a higher temperature (>1700° C.). Additionally, the YAG ceramics were not cracked during the sintering, and a uniform and high transparency was maintained. This may have been due to the lack of the reaction between YAG and molybdenum during sintering at high temperature. However, the desired level of flatness of the sintered YAG plates was not achieved. Only warped flat ceramic pieces were obtained. During the sintering at high temperature, the molybdenum foil was also warped, and this may have caused the warpage of the sintered YAG ceramics.

Comparative Example 6

YAG flat ceramic pieces were sandwiched with very rough tungsten 6 mesh with a very thick tungsten filament diameter. Due to the rough mesh structure, the sintered YAG ceramics showed slight warpage which followed the mesh structure, although no observable cracking was observed and the yield remained 100%.

Using zirconia at 1800° C., all of the ceramic pieces were cracked and stuck to the zirconia. Using molybdenum at 1800° C., there was no cracking, but the foil warped at high temperature. Using tungsten plate at 1800° C., 75%-50% of the ceramic pieces were cracked (i.e., visible cracks).

Warpage and Roughness Measurements

Figure 5:
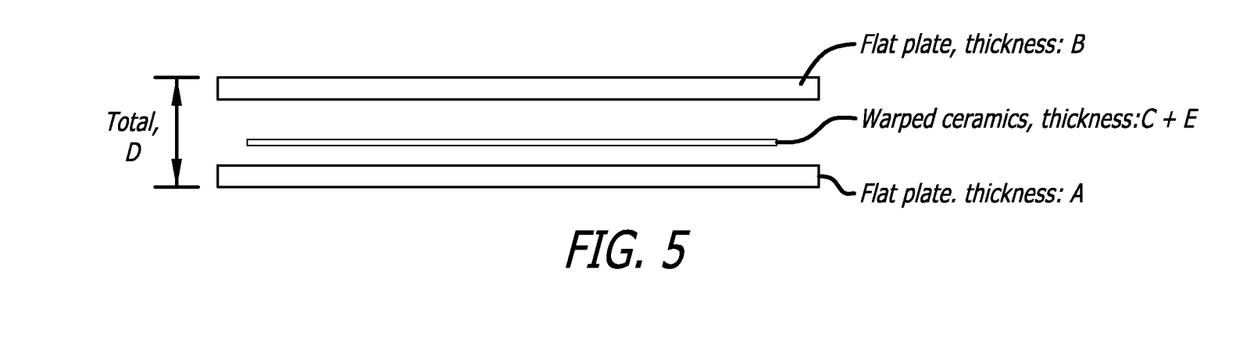
FIG. 5 illustrates a measurement of camber as described in certain embodiments herein.

One example of a method of measuring warpage is as follows. Two flat plates are disposed parallel to each other a given distance apart. See FIG. 5. The total thickness (D) of the plates (distance A+B) and the vertical displacement of the sample with warpage (distance C+E) are measured by a micrometer, where C is the known thickness of sample without warpage, and E is amount of warpage. The outside surfaces of the two parallel plates are placed within the measuring distances of a micrometer. The plates are disposed a distance sufficient to insert the sample between the plates. Once inserted, the jaws are closed until the jaws touch the plates, and the total distance between the jaws is measured by the micrometer (D). The amount of warpage (E) of the sample, then, can be calculated by D−(A+B+C), in which the known distance values of the plates and unwarped sample are subtracted from the total distance measured.

Warpage measurements of the ceramic samples from Examples 1-6 demonstrated that the methods of the present disclosure reduce warpage of the ceramic materials. All ceramic samples described in Examples 1-6 were measured for camber using a micrometer and a caliper. A micrometer has a measuring interface (tip, about 5 mm diameter) with a smaller surface area. A caliper has a larger surface area measuring interface (jaw face about 30 mm). Ceramic samples were measured with both instruments. "Good" samples have substantially similar thickness when measured by micrometer or caliper, indicating little or no warpage. The thickness measurements by micrometer were conducted at five different locations on each ceramic plane. The average values of these warpage measurements is presented in Table 3, showing the experimental results of warpage of 15 mm×15 mm ceramic plates in Examples 1-6, using micrometer and caliper.

While maintaining the flatness of the ceramics, it is also important to minimize the surface roughness of the sintered ceramics. Otherwise, great roughness of the sintered ceramics may affect the thickness measurements. Therefore, the surface roughness (represented by the arithmetic mean value Ra) of the garnet ceramics sintered using mesh was measured at five different locations on the ceramic plane, by a portable roughness tester (Model 54-400-110, Fred V. Fowler Company Inc., Newton Mass.). Any warped and/or cracked samples were excluded from this measurement due to the measurement difficulty. A summary of the average value of the surface roughness measurements of all flat samples is presented in Table 4.

TABLE 4

| Mesh type | Example 1 | Example 2 | Example 3 | Example 4 | Example 5 | Example 6 |
|---|---|---|---|---|---|---|
| Mesh 1 | 0.35 | 0.25 | 0.30 | 0.41 | 0.20 | 0.26 |
| Mesh 2 | 0.37 | 0.33 | 0.38 | 0.43 | 0.27 | 0.25 |
| Mesh 3 | 0.38 | 0.30 | 0.36 | 0.39 | 0.27 | 0.36 |

TABLE 3

| Mesh types | Example 1 | Example 2 | Example 3 | Example 4 | Example 5 | Example 6 |
|---|---|---|---|---|---|---|
| Mesh 1 | 0.41 | 0.18 | 0.19 | 0.36 | 0.17 | 0.11 |
|  | 404 | 143 | 140 | 346 | 143 | 98 |
|  | 0.01 | 0.04 | 0.05 | 0.01 | 0.02 | 0.01 |
| Mesh 2 | 0.41 | 0.18 | 0.19 | 0.38 | 0.2 | 0.13 |
|  | 404 | 143 | 141 | 345 | 142 | 96 |
|  | 0.01 | 0.04 | 0.05 | 0.03 | 0.06 | 0.04 |
| Mesh 3 | 0.41 | 0.18 | 0.18 | 0.36 | 0.17 | 0.12 |
|  | 405 | 140 | 140 | 342 | 140 | 96 |
|  | 0.01 | 0.04 | 0.04 | 0.02 | 0.03 | 0.03 |
| Mesh 4 | 0.41 | 0.16 | 0.18 | 0.37 | 0.17 | 0.11 |
|  | 404 | 140 | 142 | 347 | 144 | 96 |
|  | 0.01 | 0.02 | 0.03 | 0.01 | 0.03 | 0.02 |
| Mesh 5 | 0.43 | 0.18 | 0.16 | 0.38 | 0.17 | 0.12 |
|  | 406 | 140 | 141 | 347 | 143 | 95 |
|  | 0.03 | 0.03 | 0.02 | 0.03 | 0.03 | 0.02 |
| Mesh 6 | 0.43 | 0.15 | 0.19 | 0.37 | 0.17 | 0.11 |
|  | 406 | 142 | 140 | 347 | 141 | 96 |
|  | 0.03 | 0.01 | 0.05 | 0.02 | 0.03 | 0.01 |
| Mesh 7 | 0.43 | 0.41 | 0.42 | 0.36 | 0.22 | 0.24 |
|  | 406 | 143 | 142 | 346 | 142 | 97 |
|  | 0.03 | 0.27 | 0.31 | 0.01 | 0.08 | 0.15 |
| Comparative Example 1 | 0.82 | 0.76 | 0.81 | 0.41 | 1.20 | 1.24 |
|  | 406 | 140 | 137 | 344 | 142 | 95 |
|  | 0.41 | 0.62 | 0.67 | 0.07 | 1.06 | 1.15 |
| Comparative Example 2 | 50% cracked | All cracked | All cracked | 50% cracked | All cracked | All cracked |
| Comparative Example 3 | 50% cracked | All cracked | All cracked | 50% cracked | All cracked | All cracked |
| Comparative Example 4 | All adhered | All adhered | All adhered | All adhered | All adhered | All adhered |
| Comparative Example 5 | 0.65 | 0.53 | 0.55 | 0.54 | 0.42 | 1.09 |
|  | 404 | 143 | 142 | 346 | 142 | 97 |
|  | 0.25 | 0.39 | 0.41 | 0.19 | 0.28 | 0.99 |

Caliper, mm
Micrometer, μm
Warpage, mm

Note that Mesh 7 (see Table 1) displayed significant warpage under the conditions of Examples 2 and 3, with warpage of 0.27 mm and 0.31 mm, respectively.

Figure 6:
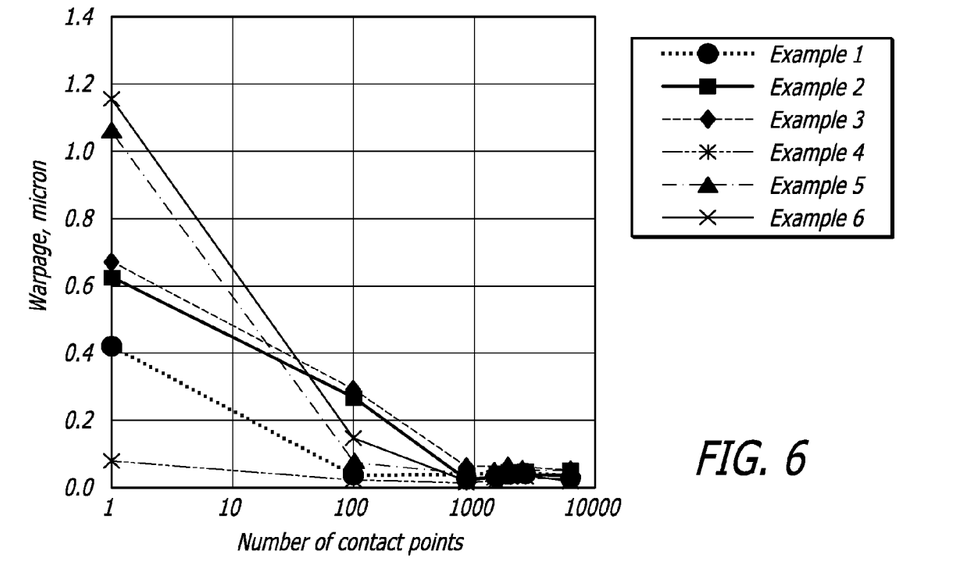
FIG. 6 illustrates the correlation between measured warpage and the number of contact points or lines in the mesh.

The correlation between measured warpage, summarized in Table 3, and the number of contact points or lines in the mesh is presented in FIGS. 6A and B for each of Examples 1-6. From this it is clear that warpage was minimized for all ceramics produced under the currently described process where the number of contact points or lines in the mesh used was increased.

TABLE 4-continued

| Mesh type | Example 1 | Example 2 | Example 3 | Example 4 | Example 5 | Example 6 |
|---|---|---|---|---|---|---|
| Mesh 4 | 0.35 | 0.23 | 0.28 | 0.39 | 0.30 | 0.26 |
| Mesh 5 | 0.36 | 0.29 | 0.29 | 0.40 | 0.28 | 0.37 |
| Mesh 6 | 0.36 | 0.30 | 0.31 | 0.37 | 0.26 | 0.26 |
| Mesh 7 | 0.55 | 0.52 | 0.59 | 0.45 | 0.49 | 0.59 |
| Comparative example 1 | N/A | N/A | N/A | 0.44 | 0.96 | N/A |

Figure 7:
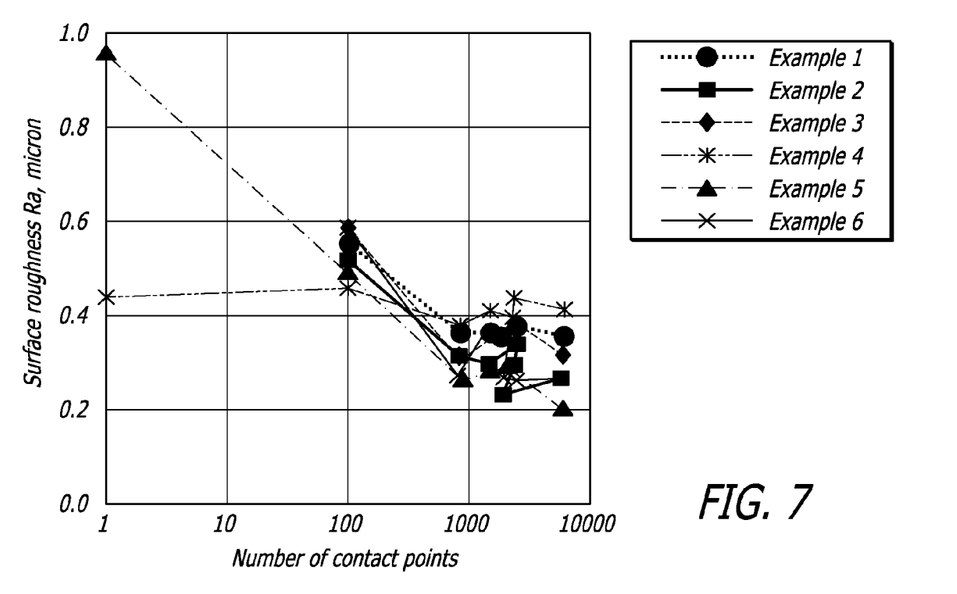
FIG. 7 illustrates the correlation between measured surface roughness (Ra) and the number of contact points or lines in the mesh.

The correlation between measures Ra, as presented in Table 4, and the mesh is presented in FIGS. 7A and B. From this it is clear that surface roughness was minimized for all ceramics produced under the currently described process where contact number of the number of contact points or lines in the mesh used was increased.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

The terms "a," "an," "the" and similar referents used in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

What is claimed:

1. A method of sintering a ceramic to produce a sintered ceramic plate, comprising:
   heating a ceramic precursor material between a first mesh and a second mesh;
   wherein at least a first portion of the ceramic precursor material contacts the first mesh and at least a second portion of the ceramic precursor material contacts the second mesh during heating,
   thereby producing a sintered ceramic plate;
   wherein either or both of the first mesh and the second mesh comprise a heat conductive material;
   wherein the ceramic is a translucent phosphor;
   wherein the number of contact points between the first mesh and the ceramic precursor is greater than about 500 per square inch; and
   wherein the number of contact points between the second mesh and the ceramic precurser is greater than about 500 per square inch.

2. The method of claim 1, wherein the heat conductive material, the heat conductive material comprises stainless steel, iron, iron alloys, copper, copper alloys, niobium, niobium alloys, molybdenum, molybdenum alloys, nickel, nickel alloys, platinum, platinum alloys, tantalum, tantalum alloys, titanium, titanium alloys, tungsten, tungsten alloys, rhenium, rhenium alloys, or any combination thereof.

3. The method of claim 2, wherein the heat conductive material comprises a tungsten:molybdenum alloy.

4. The method of claim 3, wherein the tungsten:molybdenum alloy is about 3% molybdenum.

5. The method of claim 1, wherein the ceramic precursor material slidably contacts the first mesh and/or the second mesh at a plurality of substantially periodic and/or substantially uniformly distributed contact points or lines.

6. The method of claim 5, further comprising applying sufficient pressure to the precursor material to reduce camber of the sintered ceramic plate but allow sliding engagement of the ceramic precursor material with the first mesh and the second mesh, wherein the applying sufficient pressure comprises placing a metal plate of about 0.1 gm/cm$^2$ to about 20 gm/cm$^2$ on the first mesh.

7. The method of claim 1, wherein the ceramic precursor material is a product of a slurry of solvent, binder and ceramic particles that have been heated at a sufficiently high temperature to evaporate or burn substantially all of the binder and solvent.

8. The method of claim 1, wherein camber of the sintered ceramic plate is less than 50 μm/mm$^2$ vertical displacement.

9. The method of claim 1, wherein either or both of the first mesh and the second mesh have a mesh size of more than about 30 wires per inch to about 100 wires per inch, and a wire diameter of less than 400 μm.

10. The method of claim 1, wherein either or both of the first mesh and the second mesh is configured as a plain weave or as a twill weave.

11. The method of claim 1, wherein the ceramic precursor material is in the form of an unsintered ceramic compact comprising an oxide material, a garnet material, a nitride material, and/or an oxynitride material.

12. The method of claim 11, wherein the oxide material comprises a metallic element or silicon.

13. The method of claim 11, wherein the garnet material comprises yttrium.

14. The method of claim 11, wherein the oxynitride material comprises a metallic element or silicon.

15. The method of claim 1, wherein either or both of the first mesh and the second mesh comprise wires intersecting at an angle of about 10°, about 15°, about 30°, about 45°, about 60°, about 80°, or about 90°.

16. The method of claim 1, wherein either or both of the first mesh and the second mesh have a mesh size that is the same in both dimensions, and the mesh size is about 40 ×40 wires per inch, about 50 ×50 wires per inch, about 60 ×60 wires per inch, about 70 ×70 wires per inch, or about 80 ×80 wires per inch.

17. The method of claim 1, wherein the sintered ceramic plate comprises an optionally doped yttrium aluminum garnet and/or an optionally doped lutetium aluminum garnet.

18. The method of claim 17, wherein the yttrium aluminum garnet is a gadolinium-doped yttrium aluminum garnet.

19. The method of claim 1, wherein the number of contact points between the first mesh and the ceramic precurser is less than about 6400; and wherein the number of contact points between the second mesh and the ceramic precurser is less than about 6400.

\* \* \* \* \*